(12) United States Patent
Takahashi et al.

(10) Patent No.: US 6,266,410 B1
(45) Date of Patent: *Jul. 24, 2001

(54) SPEAKERPHONE AND MICROPHONE CASE FOR THE SAME

(75) Inventors: Toshiaki Takahashi; Hidenori Oku, both of Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,025

(22) Filed: Jun. 26, 1998

(30) Foreign Application Priority Data

Jun. 27, 1997  (JP) ..................................... 9-172252

(51) Int. Cl.⁷ ....................................................... H04M 1/00
(52) U.S. Cl. ............................................................. 379/420
(58) Field of Search .................................. 379/420, 428, 379/433; 381/86, 332, 386, 389

(56) References Cited

U.S. PATENT DOCUMENTS 4,178,488  * 12/1979  Nishihata ............................. 379/420

FOREIGN PATENT DOCUMENTS

| 50-034104 | 4/1975 | (JP) . |
| 62-290252 | 12/1987 | (JP) . |
| 03234149 | 10/1991 | (JP) . |
| 04101543 | 4/1992 | (JP) . |
| 06014923 U | 2/1994 | (JP) . |
| 08223275 | 8/1996 | (JP) . |

* cited by examiner

*Primary Examiner*—Jack Chiang
(74) *Attorney, Agent, or Firm*—Finnegan, Henderson, Farabow, Garrett & Dunner, L.L.P.

(57) ABSTRACT

A speakerphone of the present invention can obtain an output in which an acoustic coupling component between a louder speaker and a speech microphone has been removed. The loudspeaker telephone set of the present invention comprises a noise canceling microphone 25 which is located near the speech microphone 6, a band-pass filter amplifier 26 for extracting only a partial frequency component of a signal from the noise canceling microphone 25 and a differential amplifier 27 for adding a signal extracted by the band-pass filter amplifier 26 in opposite phase to a signal from the speech microphone 6 so that an acoustic coupling component between the louder speaker 4 and the speech microphone 6 is canceled by the result of the above addition.

20 Claims, 20 Drawing Sheets

SPEAKERPHONE AND MICROPHONE CASE FOR THE SAME

BACKGROUND OF THE INVENTION

1. Technical Field of the Invention

The present invention relates to a speakerphone which enables a user to talk to the other party over the telephone without lifting a handset and to a microphone case for use in the same.

2. Prior Art

Heretofore, there has been known a speakerphone which incorporates a speaker and a microphone for amplifying a voice in a housing to enable a user to talk to the other party over the telephone without using a handset.

In general, in a speakerphone, a speaker and a microphone are incorporated at a relatively close distance in a same housing. Therefore, there is available a speakerphone which incorporates a voice switch circuit to prevent acoustic coupling between them, that is, a phenomenon that the voice of the other party output from the speaker is picked up by the microphone. FIG. 17 is a block diagram showing a configuration of a speakerphone incorporating a voice switch circuit. As shown in this figure, the speakerphone comprises a hybrid circuit 1, a voice switch circuit 2, a speaker amplifier for amplifying a voice (to be referred to as "speaker amplifier" hereinafter) 3, a louder speaker for outputting an amplified voice (to be referred to as "speaker" hereinafter) 4, a microphone amplifier for amplifying a voice (to be referred to as "microphone amplifier" hereinafter) 5, and a speech microphone for inputting a voice to be amplified (to be referred to as "microphone" hereinafter) 6.

The hybrid circuit 1 is an interface for connecting the speakerphone to a telephone line network 10, which outputs a received signal to the voice switch circuit 2 and a transmitted signal to the telephone line network 10 and prevents the transmitted signal from being input into the voice switch circuit 2. The voice switch circuit 2 reduces the transmitted signal level during reception and the received signal level during transmission, and comprises a reception suppression circuit 11, a transmission suppression circuit 12 and a control circuit 13. The control circuit 13 compares a transmitted signal and a received signal, controls the reception suppression circuit 11 to attenuate the received signal during transmission (transmitted signal level>received signal level) and controls the transmission suppression circuit 12 to attenuate the transmitted signal during reception (received signal level>transmitted signal level).

Since an audio output from the microphone 6 can be suppressed by the audio switch circuit 2 even when a voice from the speaker 4 is picked up by the microphone 6, acoustic coupling between the speaker 4 and the microphone 6 can be suppressed. FIG. 18 shows a block diagram illustrating acoustic coupling between the speaker 4 and the microphone 6. As shown in the figure, a received signal Sr from the other party is output from the speaker 4 on a user's side as an audio signal, the audio signal is picked up by the microphone 6 on the user's side and output to the other party as a transmitted signal St. In this case, without any voice switch circuit 2, the level of the transmitted signal St input from the microphone 6 may become larger by picking up the received signal, resulting in the occurrence of howling or acoustic echo. However, as this conventional speakerphone incorporates the voice switch circuit 2, the level of the transmitted signal St picked up by the microphone 6 is reduced, thereby suppressing the occurrence of howling or acoustic echo.

As shown in FIG. 17, the speaker amplifier 3 amplifies a received signal from the voice switch circuit 2 to a predetermined level, while the microphone amplifier 5 amplifies a transmitted signal from the microphone 6 to a predetermined level. In this case, when an appropriate speech acoustic level is 74 dBSPL (SPL; sound pressure level), a gain for the speaker amplifier 3 is set to produce an acoustic output from the speaker 4 larger than 94 dB so that a received voice from the speaker 4 is heard at 74 dBSPL. Furthermore, since an acoustic level of ca. 94 dB is added to the microphone 6 when a user speaks, a gain for the microphone amplifier 5 is set such that the acoustic level should become the regulated audio level of a telephone circuit. The received signal amplified by the speaker amplifier 3 is supplied to the speaker 4 to generate a sound while the transmitted signal amplified by the microphone amplifier 5 is supplied to the voice switch circuit 2.

FIG. 19 is a perspective view of the outer appearance of the speakerphone. As shown in this figure, sound output holes 16 for the speaker are formed in a center portion on a front left side of the housing 15, and a sound input hole 17 for the microphone is formed in a right portion on a front side of the housing 15. The speaker 4 is arranged inside the housing 15 at a position where the sound output holes are formed and the microphone 6 is arranged inside the housing 15 at a position where the sound input hole 17 is formed.

FIG. 20 is a transverse sectional view of FIG. 19, FIG. 21 is a sectional view of the key parts of FIG. 19, and FIG. 22 is an enlarged sectional view of a portion where the microphone 6 is installed. In these figures, the microphone 6 is stored in a rubber case 20, and a sound introduction surface 6A (see FIG. 22) of the microphone 6 is arranged to face the sound input hole 17. A wire 6B of the microphone 6 is connected to a circuit board 22. The rubber case 20 excludes sounds output into the inside of the housing 15 and covers all the portions of the microphone 6 except the sound introduction surface 6A. Further, a handset 18 is generally provided to the speakerphone in addition to the speaker 4 and the microphone 6 for amplifying a voice so that the user can talk through the handset 18.

However, the above conventional speakerphone has the following problems. When the user talks over the telephone at an appropriate speech level, most of a voice from the speaker 4 may be picked up by the microphone 6 and the other party may hear his/her voice like an acoustic echo. According to fluctuations in the AC impedance of a telephone circuit, a transmitted signal may leak into a received signal to generate a hybrid echo in the hybrid circuit 1. Therefore, the sound suppression loss of the voice switch circuit 2 is set large in the prior art. However, by setting the sound suppression loss large, a slight lag is produced when priority is shifted from the speaker 4 to the microphone 6, and a first portion of a word input from the microphone 6 is missing, whereby speech becomes unnatural.

Further, when big sounds are output from the speaker 4, sounds output from the rear side of the speaker 4 may stay in the inside of the housing 15 of the speakerphone and form an effective acoustic coupling passage with the microphone 6. However, it is extremely difficult to cancel it. Even when the rear side of the microphone 6 is covered by the rubber case 20, sounds from the speaker 4 are transmitted too large to the microphone 6 through a cover and base forming the housing 15 and mechanical parts such as a circuit board. If mechanical vibrations of the cover, base, printing circuit board and the like are transmitted too large to the microphone 6, the voice switch circuit 2 carries out transmission operation, the switch is electrically kept switched to the microphone 6 in the worst case, and normal communication becomes impossible.

To solve this problem, the following methods have been considered: (1) the distance between the speaker 4 and the microphone 6 is increased, (2) the rear of the speaker 4 is completely covered by another part, (3) the microphone 6 is removed from the housing 15 and installed outside the housing 15 to eliminate acoustic coupling within the housing 15, and (4) a special directional microphone is used.

However, in either case, there is no design freedom because the housing 15 becomes bulky, the number of parts is larger than required by using expensive parts, and there is no installation space inside the housing 15. Therefore, there is no definite solution to the above problems.

A speakerphone which uses an acoustic echo chancellor to reduce the voice suppression loss of the voice switch circuit 2 is conceivable. The acoustic echo chancellor cannot obtain sufficient performance (the performance of preventing sounds from the speaker 4 from being picked up by the microphone 6) if the acoustic coupling volume is large. When an acoustic echo chancellor is used, the speaker 4 and the microphone 6 must be separated from each other, and it is difficult to incorporate them in the telephone.

The present invention has been made to solve the problems of the above speakerphone and it is an object of the present invention to provide a speakerphone which can obtain appropriate speech characteristics against acoustic coupling between the speaker and the microphone. It is another object of the present invention to provide a microphone case which is effective in improving the above speech characteristics.

SUMMARY OF THE INVENTION

A speakerphone according to the present invention comprises an louder speaker for outputting a sound based on a received sound signal, a speech microphone for inputting a voice of a user, a noise canceling microphone for obtaining an input for detecting an acoustic component picked up by the speech microphone and canceling it, extraction means for extracting a partial frequency component of a signal output from this noise canceling microphone, and adding means for adding a signal extracted by the extraction means in opposite phase to a signal output from the speech microphone.

According to this constitution, an audio signal output from the louder speaker is detected by the noise canceling microphone, and a partial frequency component of the detected signal is extracted and added in opposite phase to a signal from the speech microphone so that an audio input signal from which an acoustic coupling component output from the louder speaker and picked up by the speech microphone has been removed is output from the speakerphone.

Acoustic coupling which can not be improved only by adding the above opposite-phase signal is improved by using extraction means for extracting a partial frequency component of a signal output from the noise canceling microphone.

In addition, the speech microphone is installed near the noise canceling microphone to capture with the noise canceling microphone a signal close to an acoustic coupling component picked up by the speech microphone so as to improve speech characteristics by adding the opposite-phase signal.

The speech microphone and the noise canceling microphone are installed within a housing, sounds reach the speech microphone through a sound input hole formed in the housing, and the noise canceling microphone is covered up tight in the housing. Thereby, the noise canceling microphone can always detect an acoustic coupling component stably and speech characteristics are improved appropriately using this detection because sounds picked up by the speech microphone do not change regardless of the acoustic environment of a site where the speakerphone is installed.

Since the output of the speakerphone is such that the acoustic coupling volume between the louder speaker and the speech microphone is reduced, an acoustic echo chancellor can be used even when the louder speaker and the speech microphone are incorporated in the same housing.

Since the output of the speakerphone functions to reduce the acoustic coupling volume between the louder speaker and the speech microphone, appropriate speech characteristics can be obtained without increasing the distance between the louder speaker and the speech microphone, completely covering the rear of the louder speaker by another part, removing the speech microphone from the housing or using a special directional microphone. This prevents such inconvenience that there is no design freedom because the housing becomes bulky, the number of parts is larger than required by using expensive parts, and there is no installation space inside the housing.

The output level of sounds from the louder speaker changes by frequency according to the size and shape of the speaker. Therefore, extraction means having the property of extracting a signal of a frequency range having a high output level out of signals of all frequency ranges output from the louder speaker is employed. Thereby, acoustic coupling characteristics which can not be improved by the addition of the above opposite-phase signal are improved.

The speech microphone and the noise canceling microphone may be covered by a case made of an elastic material. Thereby, the rate of sounds transmitted from the cover, base and the like forming the housing and picked up by the speech microphone can be suppressed. As the speech microphone needs to input sounds from the outside of the housing in this case, the sound detection side of the microphone is directed toward the sound input hole formed in the housing. Since the noise canceling microphone must detect sounds picked up by the speech microphone, it is installed at a position where there is no sound input hole in the housing and no gap in order to input sounds mainly from the inside of the housing.

The speech microphone may be covered by a case made of an elastic material and the noise canceling microphone may be installed at the closest position to the speech microphone of the circuit board within the housing.

A microphone case is used in a speakerphone comprising an louder speaker for outputting an amplified sound based on a received sound signal, a speech microphone for inputting a voice of a user, a noise canceling microphone for detecting an acoustic component picked up by the speech microphone and canceling it, extraction means for extracting a partial frequency component of a signal output from this noise canceling microphone, and adding means for adding a signal extracted by the extraction means in opposite phase to a signal output from the speech microphone, and characterized in that it covers the speech microphone and the noise canceling microphone and is made of an elastic material having holes formed in respective portions facing the sound detection side of the speech microphone and the sound detection side of the noise canceling microphone.

The extraction means is suitably a band-pass filter amplifier and the adding means is suitably a differential amplifier.

DETAILED DESCRIPTION OF THE INVENTION

Hereinunder a speakerphone, a microphone case, and microphone mounting structure according to an embodiment of the present invention will be described with reference to the accompanying drawings.

Figure 1:
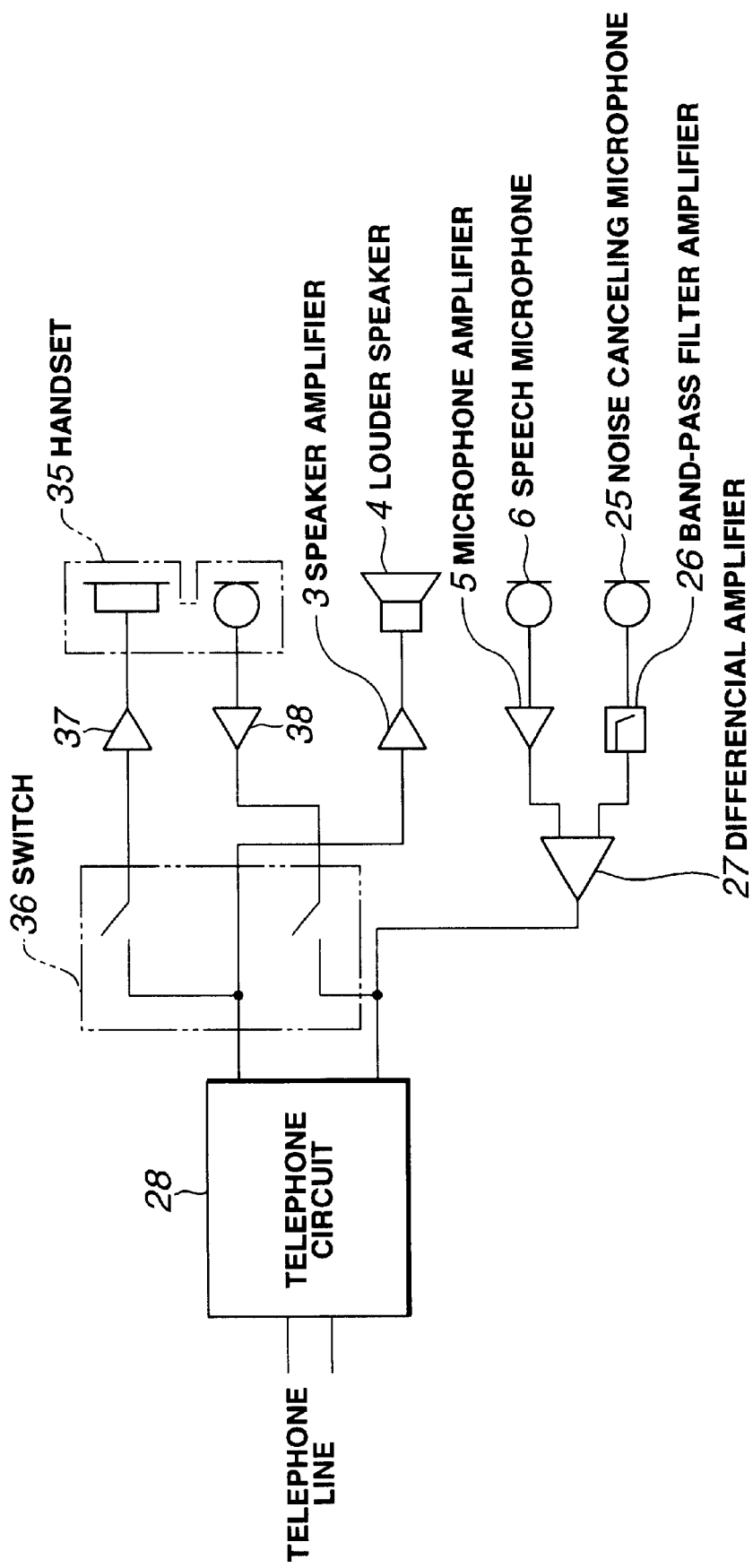
FIG. 1 is a block diagram showing the constitution of a speakerphone according to an embodiment of the present invention.
Figure 2:
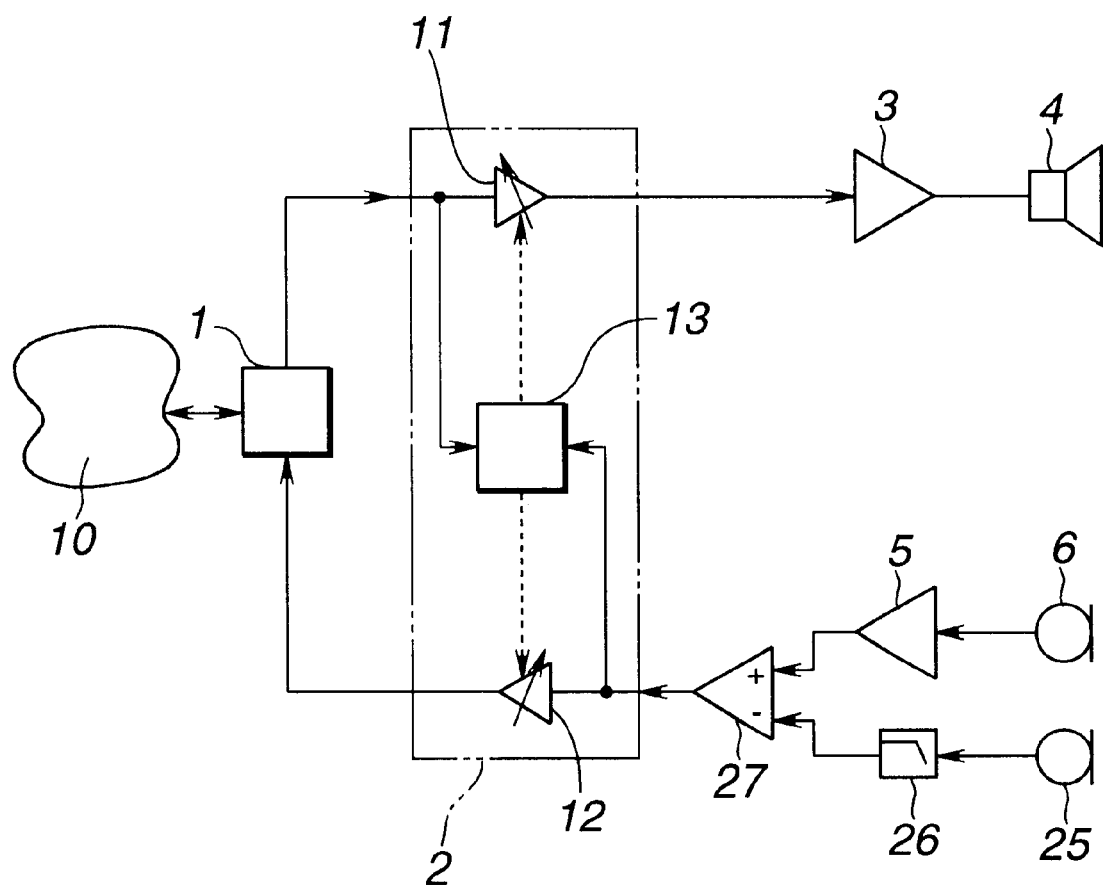
FIG. 2 is a block diagram showing the constitution of the speech network system of the speakerphone according to the embodiment of the present invention.
Figure 3:
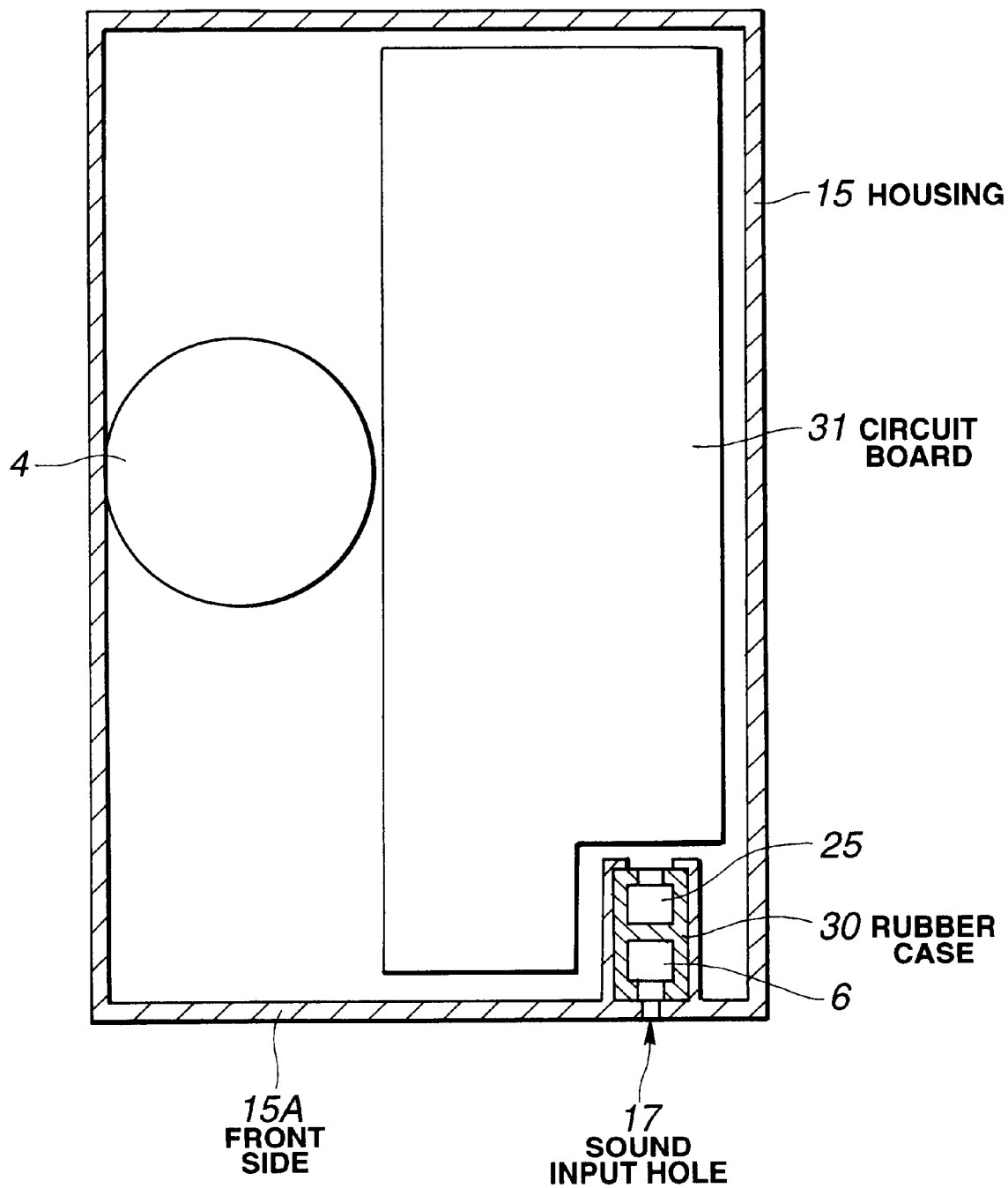
FIG. 3 is a transverse sectional view of the speakerphone according to the embodiment of the present invention.

FIG. 1 is a block diagram showing the constitution of a speakerphone according to the embodiment of the present invention, FIG. 2 is a block diagram showing the constitution of the speech network system of the embodiment, and FIG. 3 is a transverse sectional view of the loudspeaker telephone set according to the embodiment. In these figures, common parts in FIGS. 17 to 22 are given the same reference symbols.

According to this embodiment, as shown in FIG. 1, a noise canceling microphone (to be referred to as "sub microphone" hereinafter) 25 and a band-pass filter amplifier (extraction means) 26 are provided in a speech input system comprising a microphone amplifier (to be referred to as "microphone amplifier" hereinafter) 5 and a speech microphone (to be referred to as "main microphone" hereinafter) 6, and a differential amplifier (adding means) 27 for obtaining a difference between the output of the microphone amplifier 5 and the output of the band-pass filter amplifier 26 is also provided in the system. In this case, the sub microphone 25 has the same performance as the main microphone 6.

Figure 4:
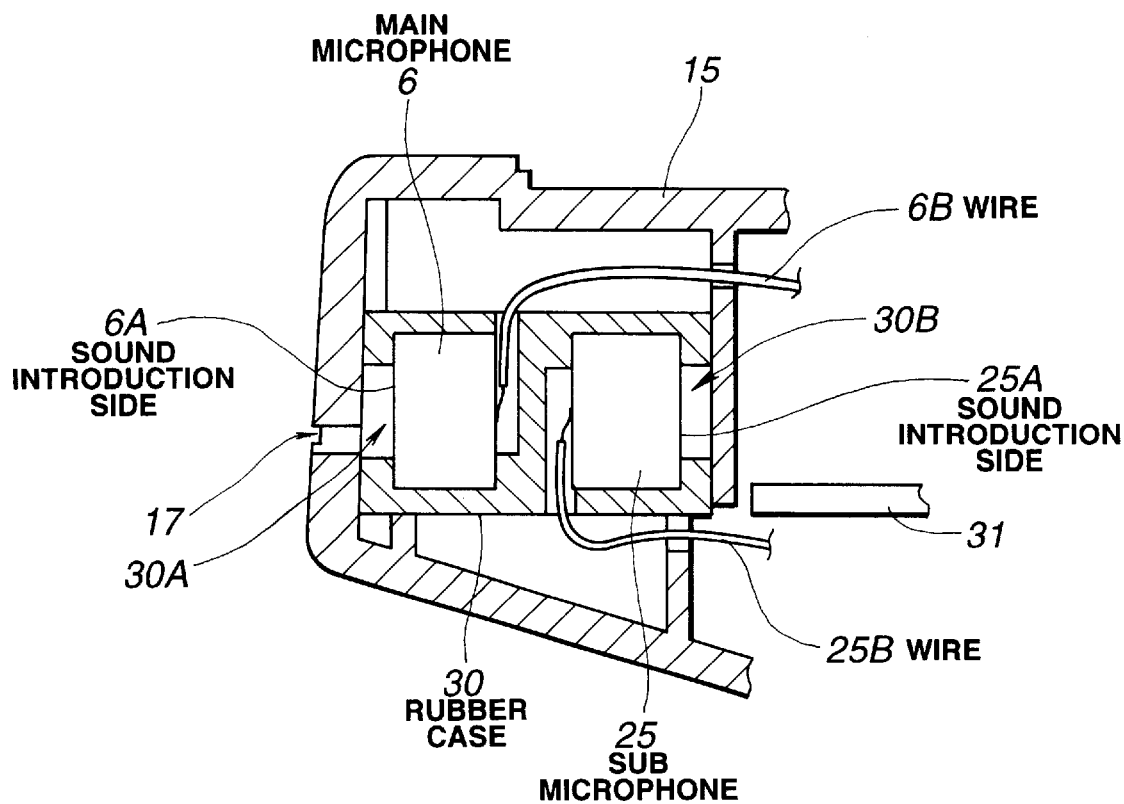
FIG. 4 is a sectional view of a portion for installing a speech microphone and a noise canceling microphone of the speakerphone according to the embodiment of the present invention.

As shown in FIG. 3, the main microphone 6 and the sub microphone 25 are stored in a rubber case 30 forming a microphone case in such a manner that they are arranged adjacent to each other, and the rubber case 30 is installed in the right portion of a front side 15A of a housing 15. As shown in FIG. 4 which is a sectional view of a portion for installing the main microphone 6 and the sub microphone 25, a hole 30A and a hole 30B are formed in the rubber case 30 on both of a front side and a rear side of the housing 15. The hole 30A faces a sound introduction side 6A (sound detection side) of the main microphone 6 and the other hole 30B faces a sound introduction side 25A of the sub microphone 25. That is, the microphone case has a first room facing a sound input hole 17 of the housing 15 and a second room formed at the rear of the first room with a barrier interposed therebetween. The main microphone 25 is stored in the first room in such a manner that the sound introduction side 6A faces the sound input hole 17 and the sub microphone 25 is stored in the second room in such a manner that the sound introduction side 25A is directed toward the inside of the housing 15 through the hole 30B. According to this constitution, the transmitted sound from the user enters from the sound input hole 17 of the housing 15 and reaches the sound introduction side 6A of the main microphone 6 through the hole 30A of the rubber case 30.

Meanwhile, a sound output to the inside of the housing 15 from the rear of the speaker 4 reaches the sound introduction side 25A of the sub microphone 25 through the hole 30B of the rubber case 30. A sound transmitted through the cover, base and the like forming the housing 15 and mechanical parts such as a circuit board 31 reaches the main microphone 6 and the sub microphone 25 through the rubber case 30. The above rubber case 30 may be made of an elastic material other than rubber, such as a synthetic resin, sponge or the like.

Since the sound introduction side 25A of the sub microphone 25 is arranged to face the interior of the housing 15 and a peripheral portion excluding the sound introduction side 25A of the sub microphone 25 is covered by the rubber case 30, the transmitted sound of the user is rarely picked up by the sub microphone 25 directly. Since the sub microphone 25 is located near the main microphone 6, a time lag between the time of acoustic coupling between the speaker 4 and the main microphone 6 and the time of acoustic coupling between the speaker 4 and the sub microphone 25 is minimized, acoustic couplings of the same degree are obtained, and the removal of an acoustic coupling component by the differential amplifier 27 is advantageously carried out at the time of addition. A wire 6B of the main microphone 6 and a wire 25B of the sub microphone 25 are connected to the circuit board 31 so that an input audio signal is transmitted to the microphone amplifier 5 and the band-pass filter amplifier 26 on the circuit board 31.

Figure 5:
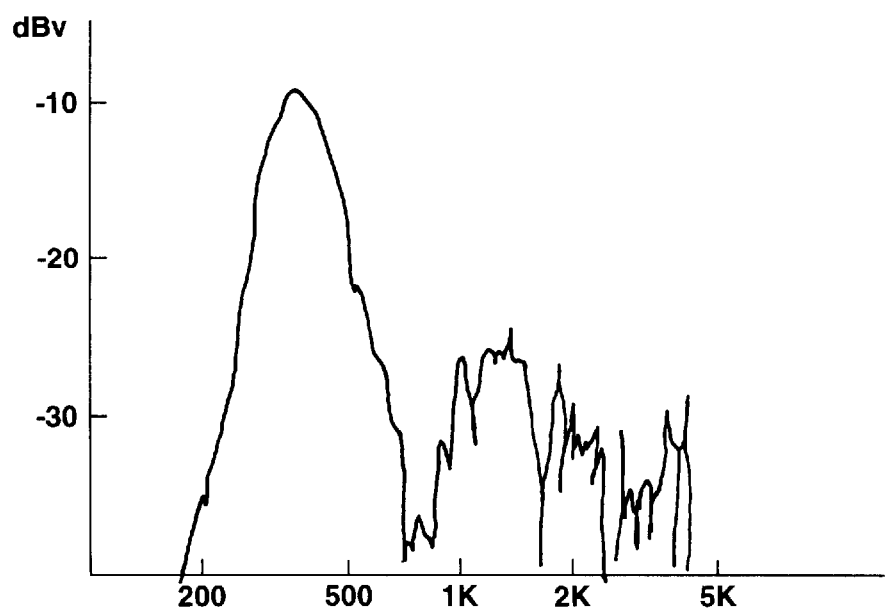
FIG. 5 is a diagram showing the output value with respect to the frequency of a microphone amplifier of the speakerphone according to the embodiment of the present invention.

FIG. 5 shows the output characteristics of the speakerphone having the above constitution with respect to the frequency of the microphone amplifier 5. As is obvious from FIG. 5, it is understood that the output level thereof is the highest at a frequency range of 350 to 500 Hz. The acoustic coupling volume becomes the largest at a frequency range where the output level is the highest, and the acoustic coupling volume of the speakerphone is determined. In this case, the frequency range at which the output level is the highest differs according to the size and shape of the speaker 4. Since a small-diameter speaker is generally used in a loudspeaker telephone set, the frequency range shown in FIG. 5 is used.

Returning to FIG. 1, the band-pass filter amplifier 26 extracts only a 300 to 600 Hz frequency component (namely, a signal having a low audio frequency) from the output of the sub microphone 25. The signal extracted by the band-pass filter amplifier 26 is added in opposite phase to a signal output from the microphone amplifier 5 by the differential amplifier 27. Thereby, the differential amplifier 27 outputs an audio signal in which an acoustic coupling component having a frequency range of 300 to 600 Hz is reduced.

Figure 6:
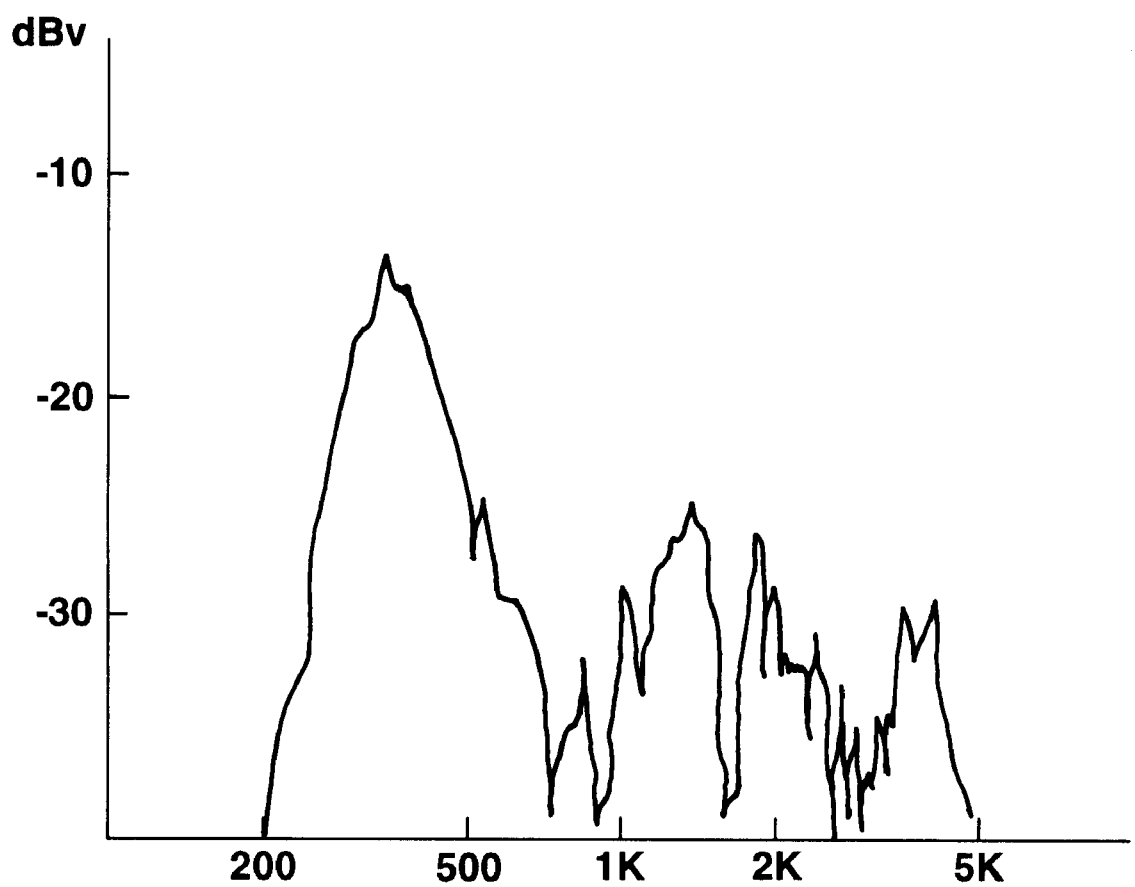
FIG. 6 is diagram showing the output value with respect to the frequency of a differential amplifier of the speakerphone according to the embodiment of the present invention.

FIG. 6 shows the output value of the differential amplifier 27 with respect to frequency. It is seen that the output value of the differential amplifier 27 is lower than the output value of the microphone amplifier 5 shown in FIG. 5 at a frequency range of 300 to 600 Hz. Due to a reduction in the output level at a frequency range of 300 to 600 Hz, a component corresponding to the acoustic coupling volume between the speaker 4 and the main microphone 6 decreases. Thereby, a component corresponding to acoustic coupling between the speaker 4 and the main microphone 6 can be reduced without increasing the sound suppression loss of the voice switch circuit 2.

The reason why the band-pass filter amplifier 26 is necessary is provided. Even when the sub microphone 25 is located near the main microphone 6, it is extremely difficult to perfectly match the phases at audio frequency range (200 Hz to 3.3 kHz) due to the existence of the sound input hole 17 and a slight difference in the surrounding environment of the microphone between them. Even when the differential amplifier 27 is designed to cancel a component corresponding to acoustic coupling between the speaker 4 and the main microphone 6 at a low frequency range, the above canceling effect cannot be fully obtained at a high frequency range, or a great value may be obtained by adding a signal from the main microphone 6 and a signal from the sub microphone 25 in opposite phase because they do not match perfectly.

Figure 13:
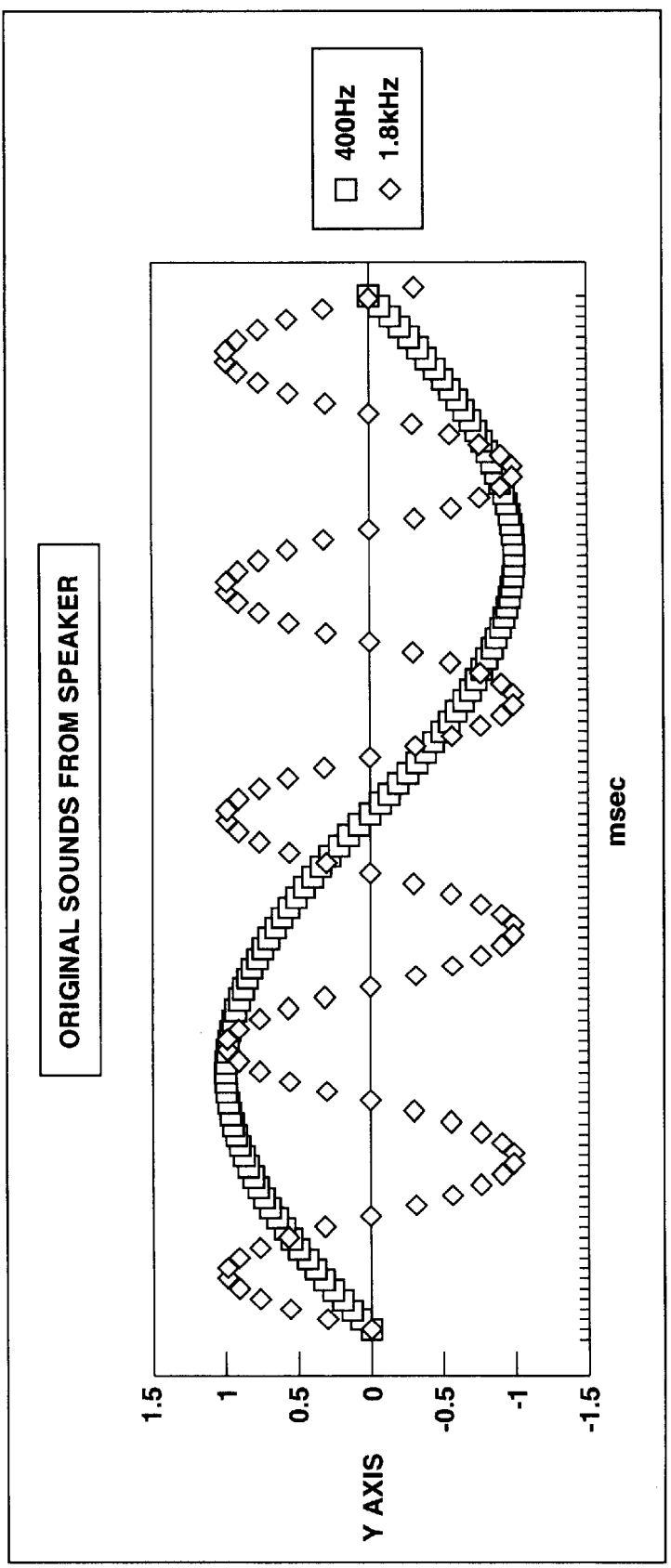
FIGS. 13, 14, 15 and 16 are diagrams showing the propagation of a 400 Hz signal and a 1.8 kHz signal output from a speaker and a difference between them.

This is described using a more specific example. In the speakerphone, the distance between the speaker 4 and the main microphone 6 is ca. 17 cm. The main microphone 6 and the sub microphone 25 are separated from each other by ca. 1 cm from the sizes of these parts, and the distance between the speaker 4 and the sub microphone 25 is ca. 16 cm. Supposing that the speaker 4, main microphone 6 and sub microphone 25 are situated in free space, when a 400 Hz sound and a 1.8 kHz sound (the maximum amplitude is "1") are output from the speaker 4, the waveforms of these sounds are such as shown in FIG. 13.

Figure 14:
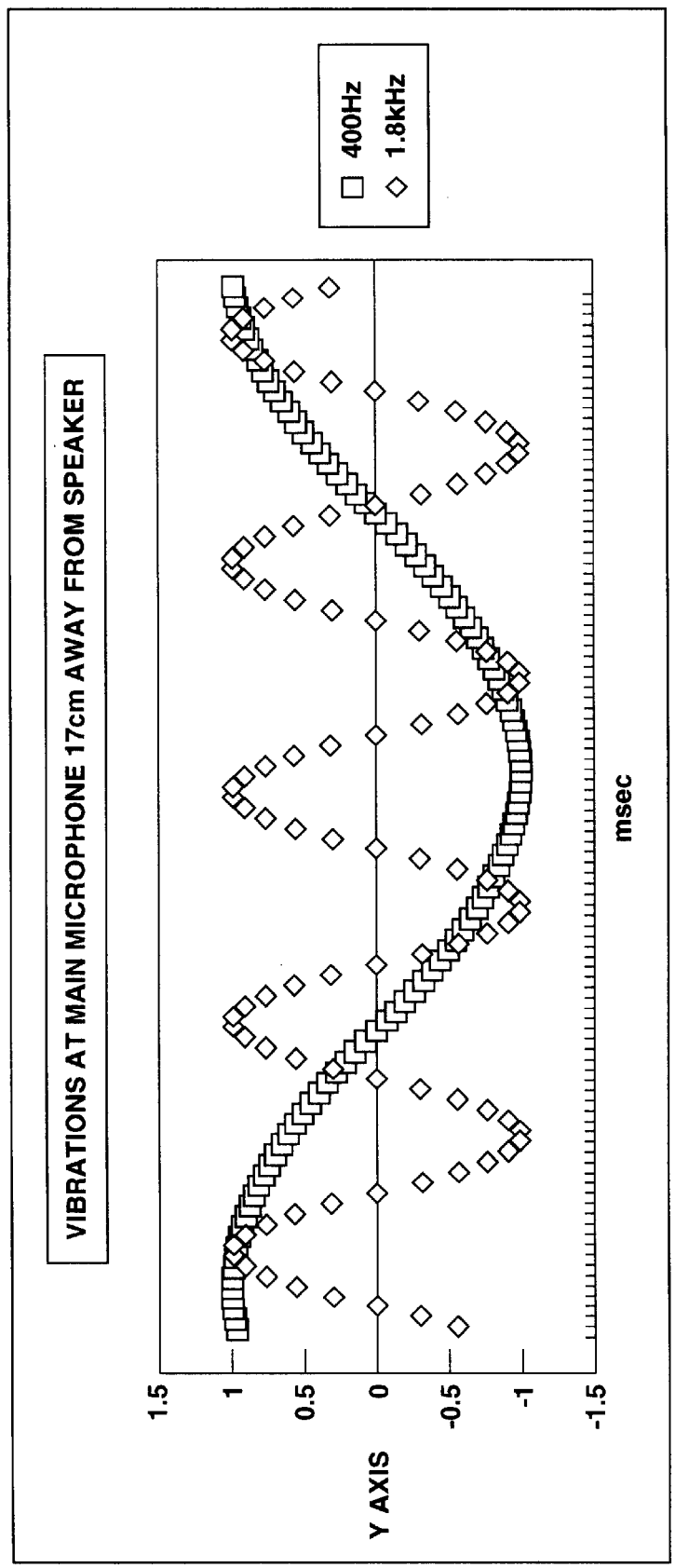
Figure 15:
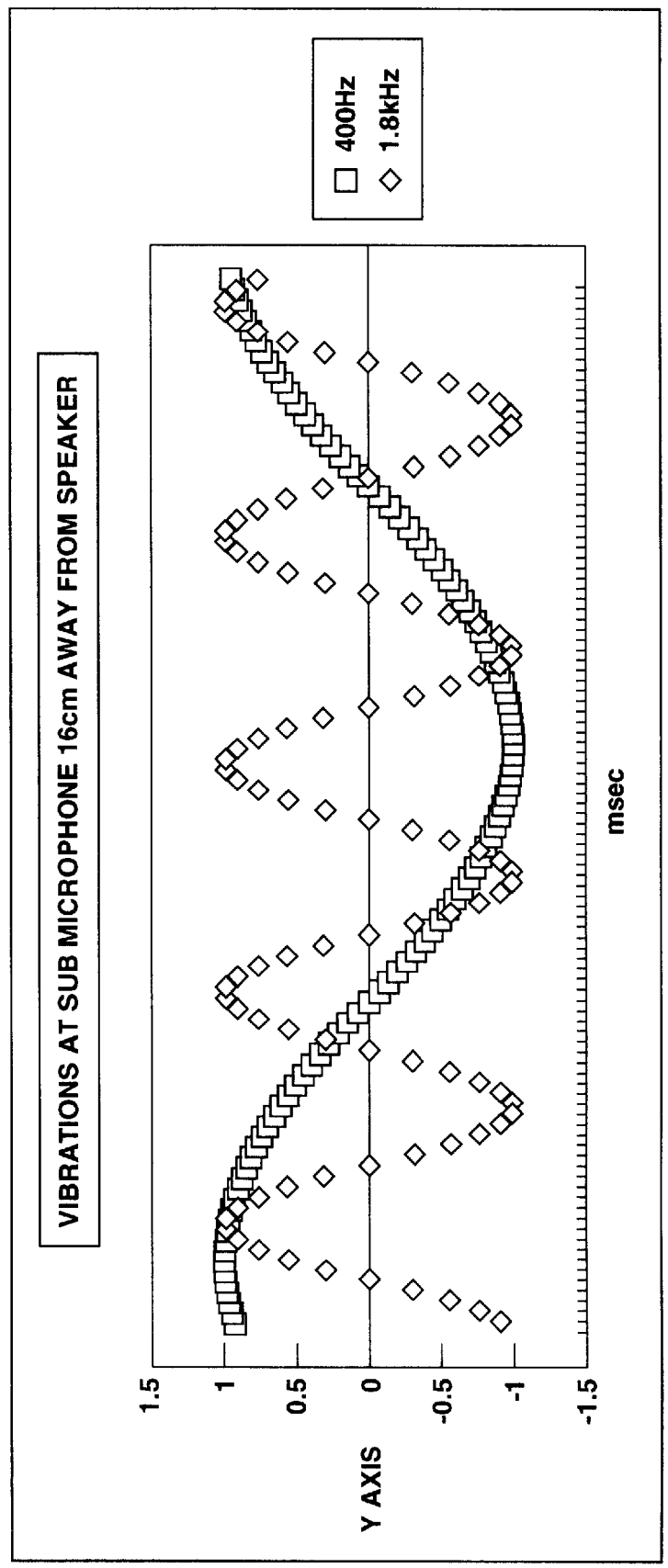
Figure 16:
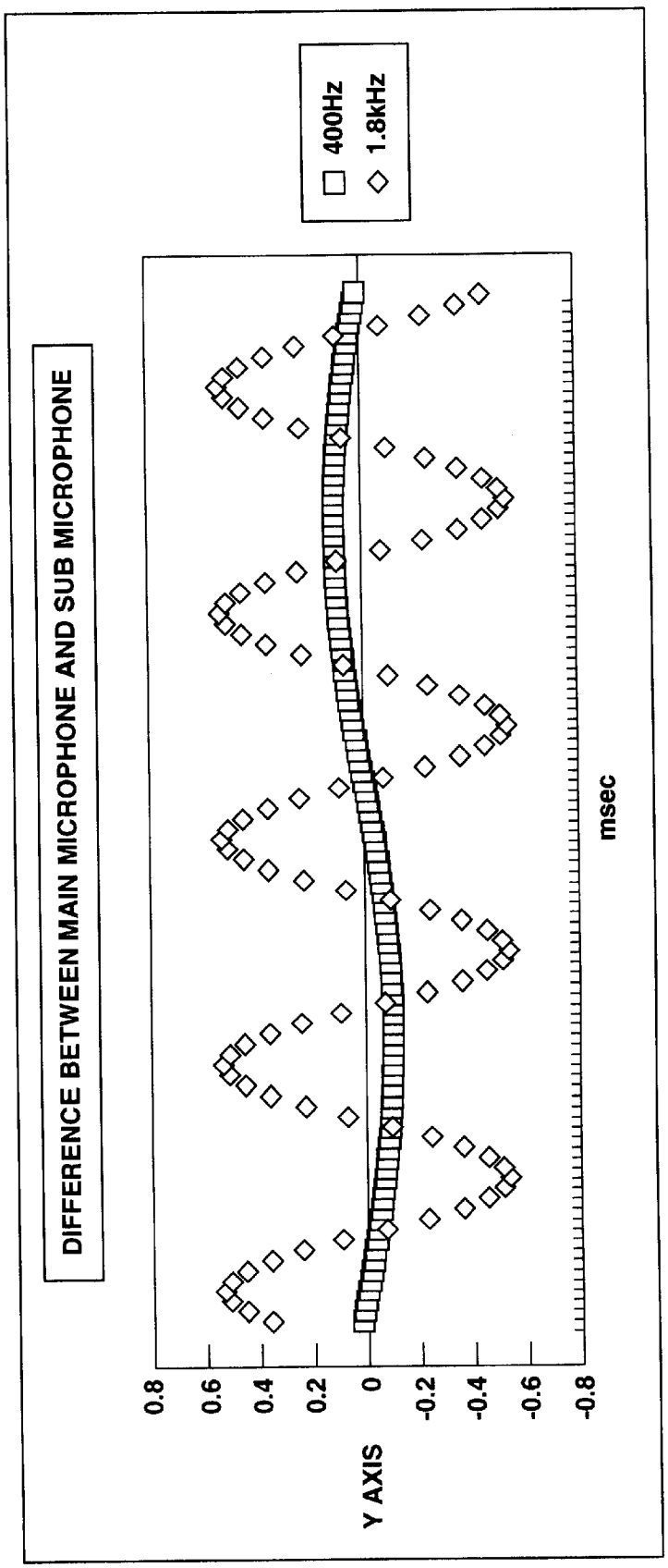
Figure 17:
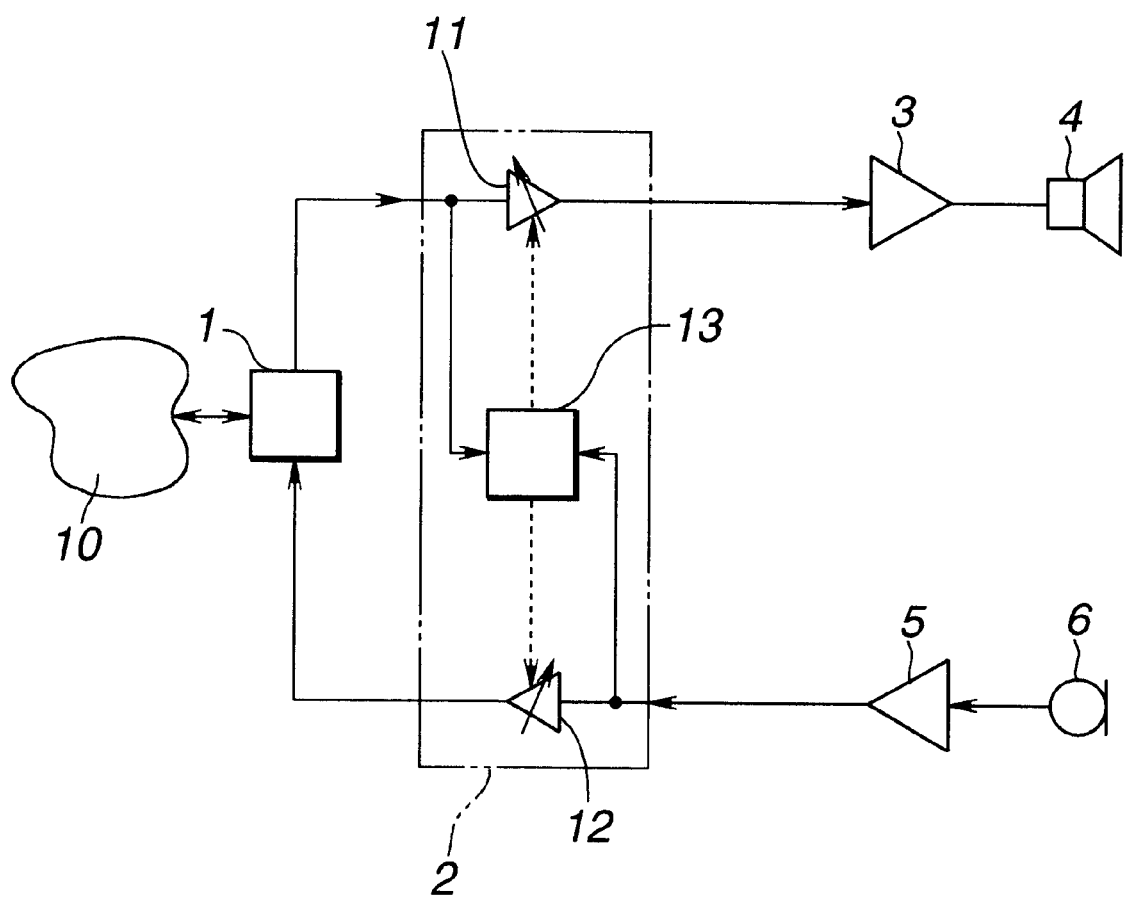
FIG. 17 is a block diagram showing the constitution of the speech network system of a conventional speakerphone.
Figure 18:
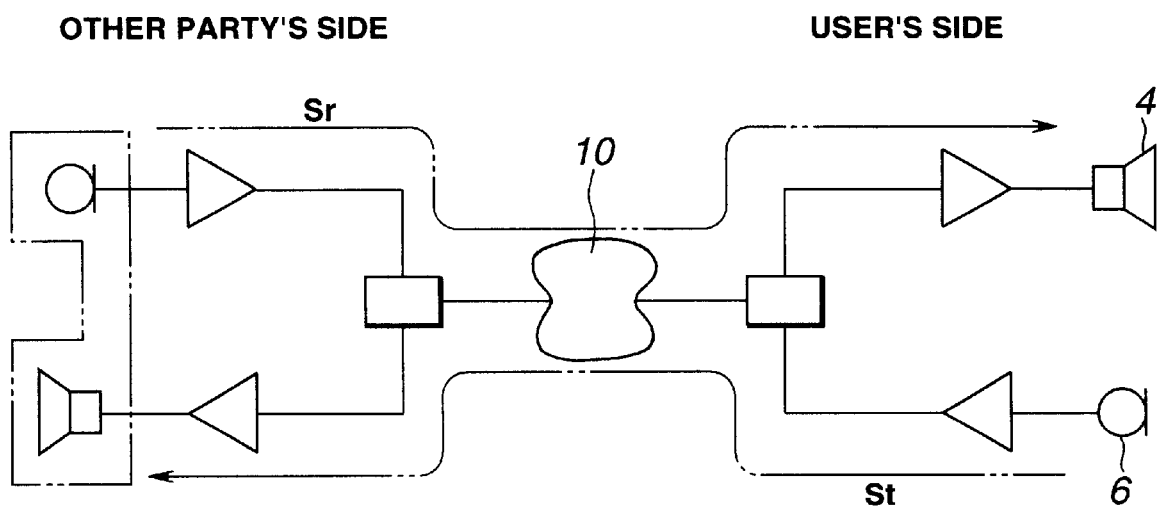
FIG. 18 is a block diagram showing acoustic coupling between a louder speaker and a speech microphone in the conventional speakerphone.
Figure 19:
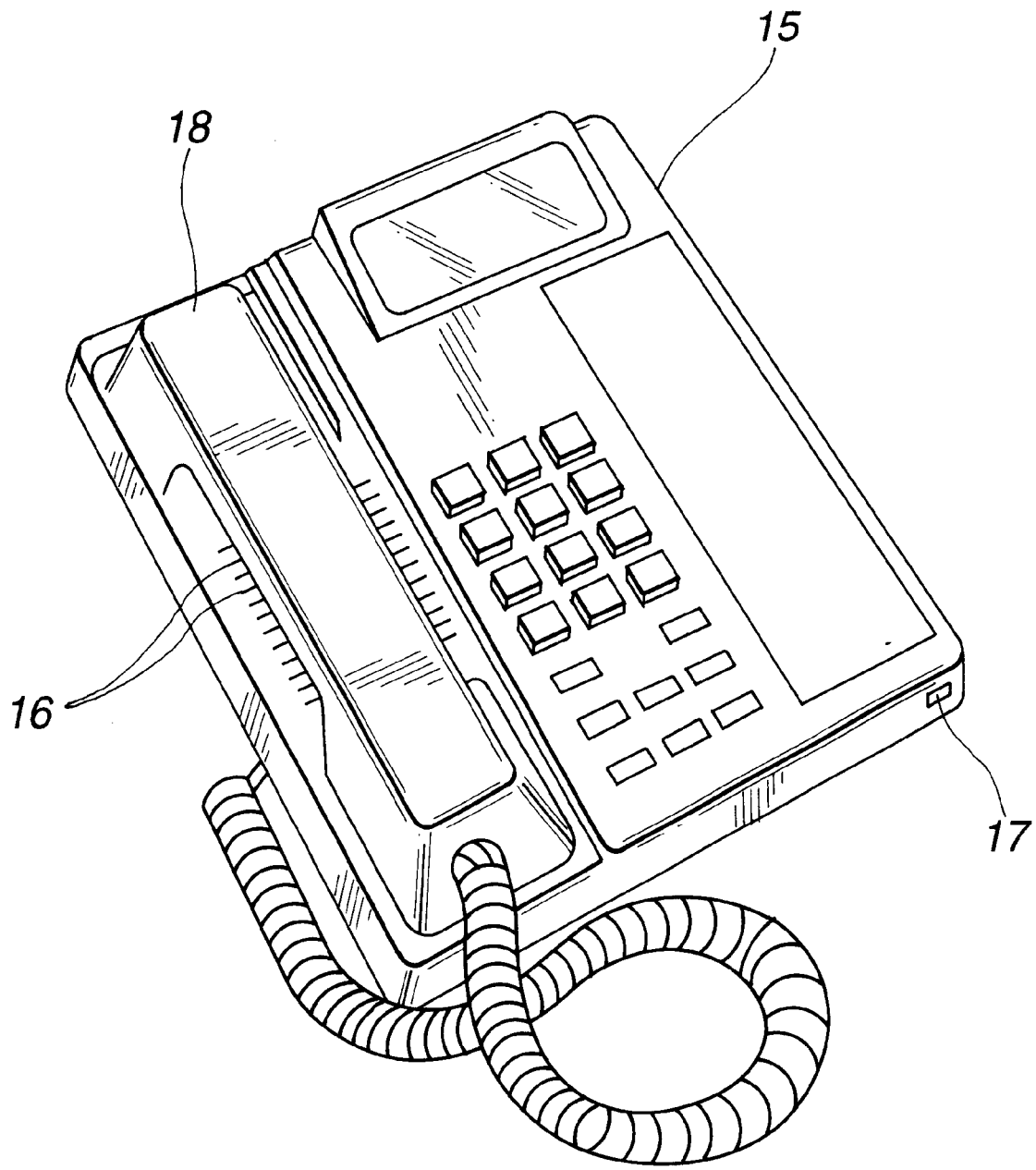
FIG. 19 is a perspective view of the outer appearance of the conventional speaker.
Figure 20:
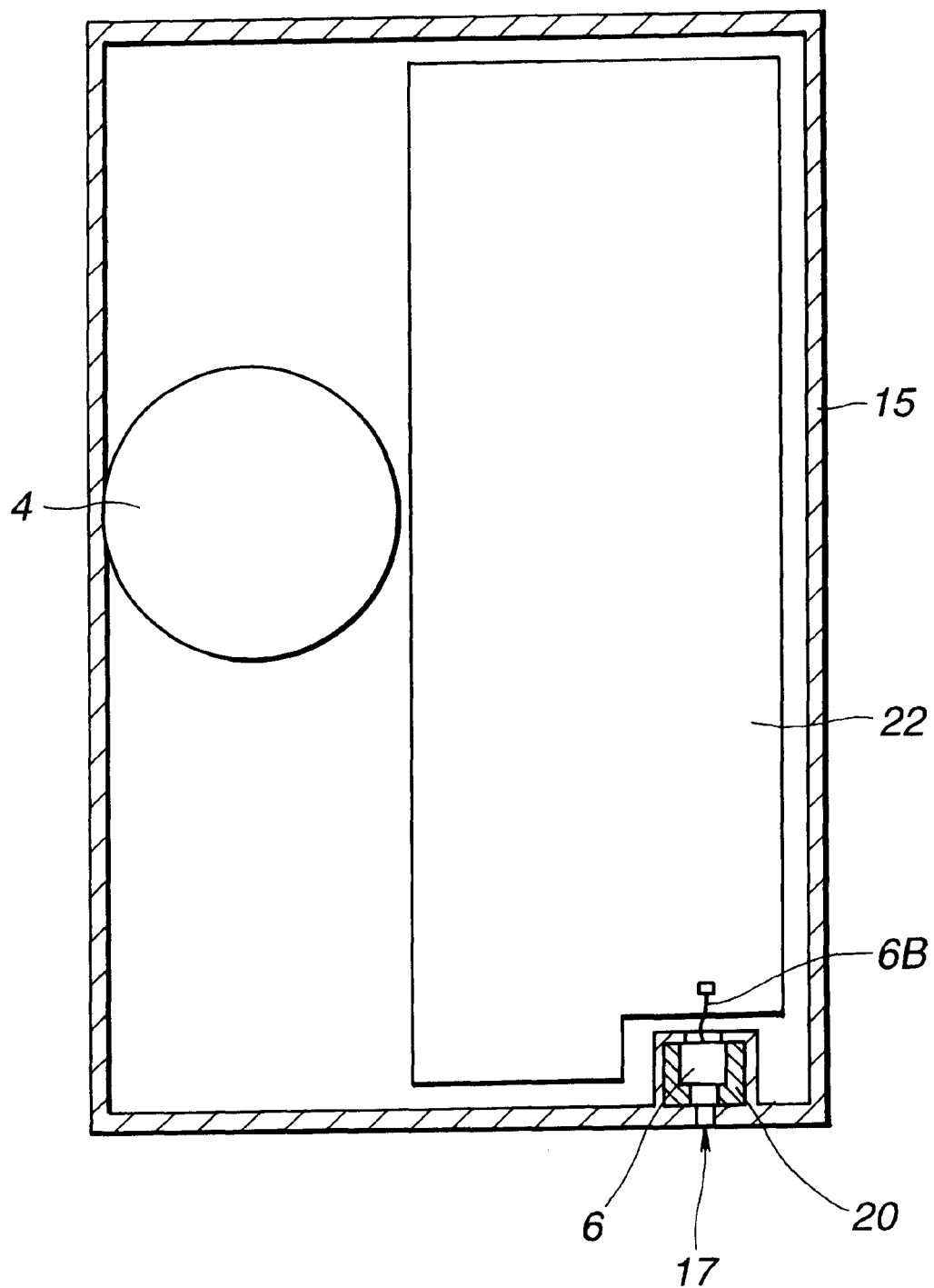
FIG. 20 is a transverse sectional view of the conventional speakerphone shown in FIG. 18.
Figure 21:
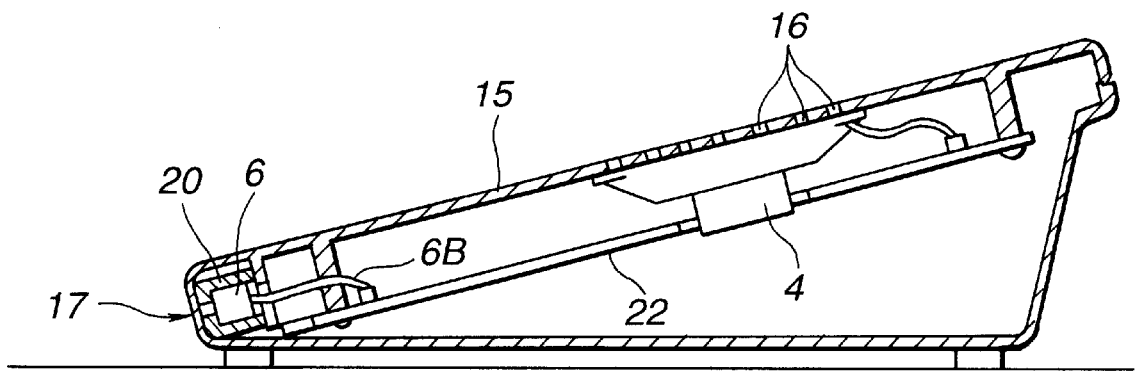
FIG. 21 is a longitudinal sectional view of the key parts of the conventional speakerphone shown in FIG. 18.
Figure 22:
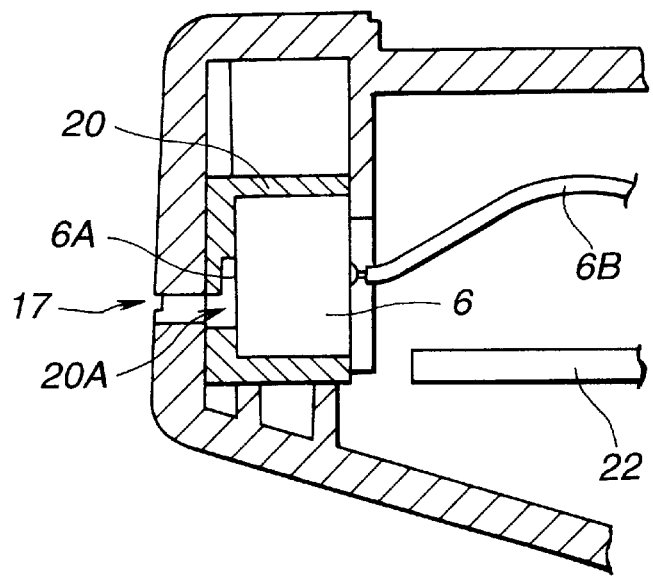
FIG. 22 is an enlarged sectional view of a portion for installing a speech microphone of the conventional speakerphone.

The vibrations corresponding to the 400 Hz and 1.8 kHz sounds at the position of the main microphone 6 which is located 17 cm away from the speaker 4 have waveforms which shift in phase from the waveforms of the original sounds as shown in FIG. 14. The vibrations corresponding to the 400 Hz and 1.8 kHz sounds at the position of the sub microphone 25 which is located 16 cm away from the speaker 4 have waveforms which shift in phase from the waveforms of the original sounds as shown in FIG. 15. Further, the waveforms of vibrations at the position of the main microphone 6 which is 17 cm away from the speaker 4 and the waveforms of vibrations at the position of the sub microphone 25 which is 16 cm away from the speaker 4 slightly shift from each other in phase. The phase differences are caused by the difference of distance. Then, when the difference between the waveform of each vibration at the position of the main microphone 6 and the waveform of each vibration at the position of the sub microphone 25 is taken, the difference for the 400 Hz sound is small but the difference for the 1.8 kHz sound is larger than the difference for the 400 Hz sound as shown in FIG. 16. It is considered that this is a phenomenon which occurs when the difference is simply taken without using the band-pass filter amplifier 26. That is, when the difference between the output signal of the main microphone 6 and the output signal of the sub microphone 25 is simply taken, the difference for the 400 Hz sound can be made small but the difference for the 1.8 kHz sound cannot be made small. It is understood from this phenomenon that an appropriate canceling effect cannot be obtained simply by taking the difference between the output signal of the main microphone 6 and the output signal of the sub microphone 25 when the signals have a high frequency (frequency higher than 600 Hz) out of the audio frequency range (200 Hz to 3.3 kHz).

Further, it is actually impossible that the speakerphone is installed in free space and the speakerphone is influenced by reflecting objects surrounding it such as walls and goods and reflecting objects inside the telephone such as circuit parts and substrate. In this case, since the wavelength of 400 Hz is 86 cm, the wavelength of 1 kHz is 34 cm, and the wavelength of 2 kHz is 17 cm, a signal having a short wavelength, particularly 2 kHz or higher, is influenced by objects surrounding the telephone at a distance of 15 cm from the speaker 4 while a signal having a low frequency is rarely influenced because the distance to an influencing object is long and the signal of a reflected wave is attenuated. Therefore, there are a large number of components which cannot be canceled simply by the difference as described above and these components must be removed.

Further, when 400 Hz and 2 kHz signals are compared with each other, one cycle T of the 400 Hz signal is 2.5 msec and one cycle T of the 2 kHz signal is 0.5 msec. When a signal is returned by reflection and received by the sub microphone 25, a high-frequency signal is greatly influenced by a time difference. In this case, as a component influencing the signal cannot be canceled by the above difference, it must be removed.

Figure 7:
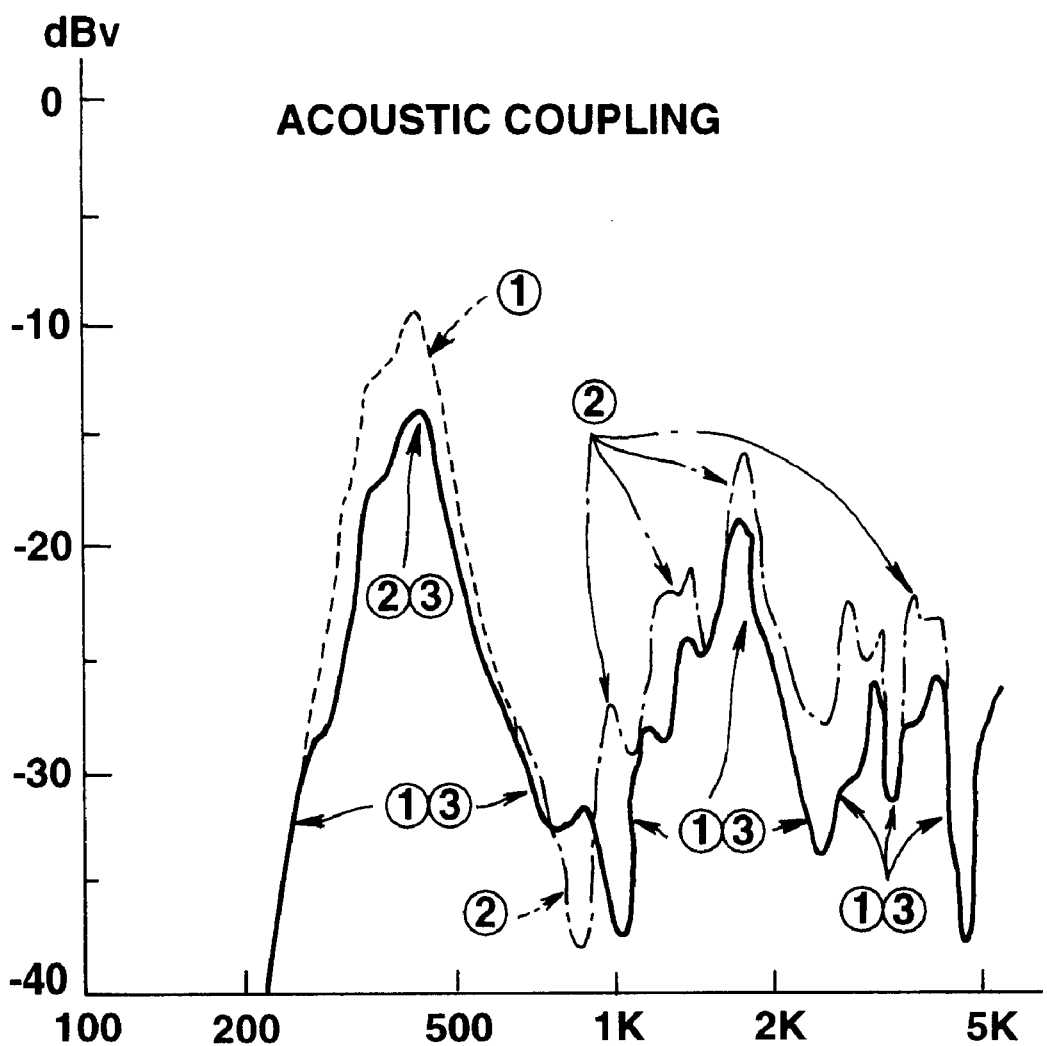
FIG. 7 is a diagram showing the frequency characteristics of acoustic coupling for explaining the effect of the speakerphone according to the embodiment of the present invention.

Then, an acoustic coupling component of a signal having a high frequency (frequency higher than 600 Hz) out of the audio frequency range (200 Hz to 3.3 KHz) is suppressed by the above band-pass filter amplifier 26. In FIG. 7, the frequency characteristics of the output value of acoustic coupling when only the main microphone 6 is used (in the case of constitution shown in FIG. 12) are shown by a broken line and (1), the frequency characteristics of the output value of acoustic coupling when the main microphone 6 and the sub microphone 25 are used (when the band-pass filter amplifier 26 is not used) are shown by a dash and dotted line and (2), and the frequency characteristics of the output value of acoustic coupling when the main microphone 6, the sub microphone 25 and the band-pass filter amplifier 26 are used are shown by a solid line and (3).

It is understood from FIG. 7 that the effect of suppressing an acoustic coupling component is larger when the sub microphone 25 is used (dash and dotted line and (2)) than when only the main microphone 6 is used (broken line and (1)) at a range of 200 Hz to 1 kHz and that a large value is obtained by adding a signal from the main microphone 6 and a signal from the sub microphone 25 in opposite phase at a range of 1 kHz to 5 kHz because these output signals do not match perfectly. In contrast to this, the effect of suppressing an acoustic coupling component is observed by using the band-pass filter amplifier 26 (solid line and (3)) not only at a range of 200 Hz to 1 kHz but also at a range of 1 kHz to 5 kHz where the output value lowers. Thus, the present invention is aimed to suppress an acoustic coupling component at the entire audio frequency range by using the band-pass filter amplifier 26.

As shown in FIG. 1, a handset 35 is provided in the speakerphone and connected to a telephone circuit 28 through a switch 36. The handset 35 can be used by turning on (closing) the switch 36. A speaker amplifier 37 and a microphone amplifier 38 are provided between the handset 35 and the switch 36. The telephone circuit 28 comprises a hybrid circuit 1 and a voice switch circuit 2.

Further, in this embodiment, the sound introduction side 25A is arranged near the main microphone 6 to face toward the interior of the housing 15. Thereby the sub microphone 25 can detect sounds output from the rear of the speaker 4 and transmitted through the inside of the housing 15 and sounds transmitted through the cover, base and the like forming the housing 15 and mechanical components such as the circuit board 31 can be detected by the sub microphone 25. Therefore, a signal irrelevant to acoustic coupling between the speaker 4 and the main microphone 6, such as a voice of the user reflected in the room is not input and a signal from which a component corresponding to the acoustic coupling has been removed can be obtained as the output of the differential amplifier 27, thereby making it possible to reduce the sound suppression loss of the voice switch circuit 2. As a result, a lag which is produced when priority is shifted from the speaker 4 to the main microphone 6 is reduced and natural speech is possible without the loss of a first word immediately after switching to the main microphone 6.

It is not necessary to increase the distance between the speaker 4 and the main microphone 6, completely cover the rear of the speaker 4 by another part, remove the main microphone 6 from the housing 15, or use a special directional microphone. Therefore, there is no such inconvenience that there is no design freedom because the housing 15 becomes bulky, the number of parts is larger than required by using expensive parts, or there is no installation space inside the housing 15.

Since it is substantially possible to reduce the acoustic coupling volume in the output of the speakerphone, an acoustic echo chancellor can be used while the sufficient volume of the speaker is ensured, thereby making it possible to realize a speakerphone having improved simultaneous speech performance. That is, in this embodiment, a voice switch circuit 2 is provided in the telephone circuit 28 as means for attenuating a transmitted signal from the speech microphone during reception and attenuating a received signal to be supplied to the louder speaker during transmission. In an alternate embodiment, the above acoustic echo chancellor may be used in place of the voice switch circuit 2 as means for attenuating a transmitted signal from the speech microphone during reception and suppressing a received signal to be supplied to the louder speaker during transmission.

Since the acoustic coupling volume becomes the largest at a frequency range of 350 to 500 Hz in the speaker 4 of this embodiment, the band-pass filter amplifier 26 which has a transmission frequency range of 300 to 600 Hz is used. However, since the frequency range at which the output level of the microphone amplifier 5 becomes the highest differs according to the size and shape of the speaker, the transmission frequency range for the band-pass filter amplifier may be selected according to the speaker used.

Figure 8:
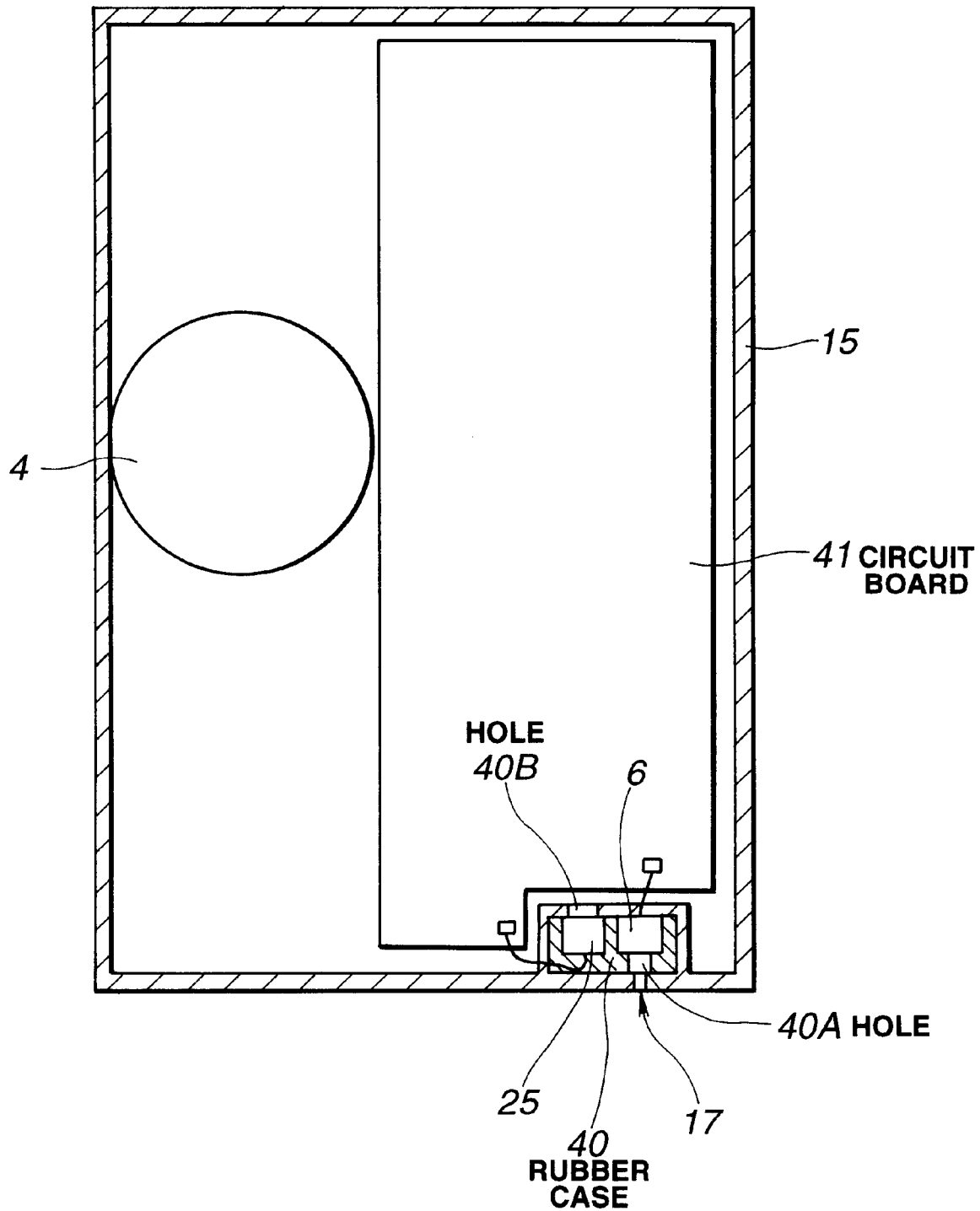
FIG. 8 is a transverse sectional view of a first variation of a speakerphone according to the embodiment of the present invention.

FIG. 8 is a transverse sectional view of a variation of a speakerphone according to the above embodiment of the present invention. In this speakerphone, the main microphone 6 and the sub microphone 25 are arranged side by side in a width direction of the housing 15 as shown in the figure. The circuit configuration of the loudspeaker telephone set is shown in FIGS. 1 and 2. In the constitution of this variation, the sound introduction side 6A of the main microphone 6 is arranged to face the sound input hole 17 of the housing 15 while the sound introduction side 25A of the sub microphone 25 is arranged to face toward the interior of the housing 15. A rubber case 40 which is a microphone case for storing the main microphone 6 and the sub microphone 25 has first and second rooms for storing the main microphone 6 and the sub microphone 25 side by side, and the main microphone 6 and the sub microphone 25 are stored in the respective rooms. Holes 40A and 40B which are open in opposite directions are formed in portions facing the sound introduction sides 6A and 25A of the rooms, respectively. The wires 6B and 25B of the main microphone 6 and the sub microphone 25 are connected to the microphone amplifier 5 and the band-pass filter amplifier 26 on the circuit board 41, respectively. The same effect as that of the above embodiment can be obtained in this variation in which the main microphone 6 and the sub microphone 25 are arranged side by side in a width direction of the housing 15.

Figure 9:
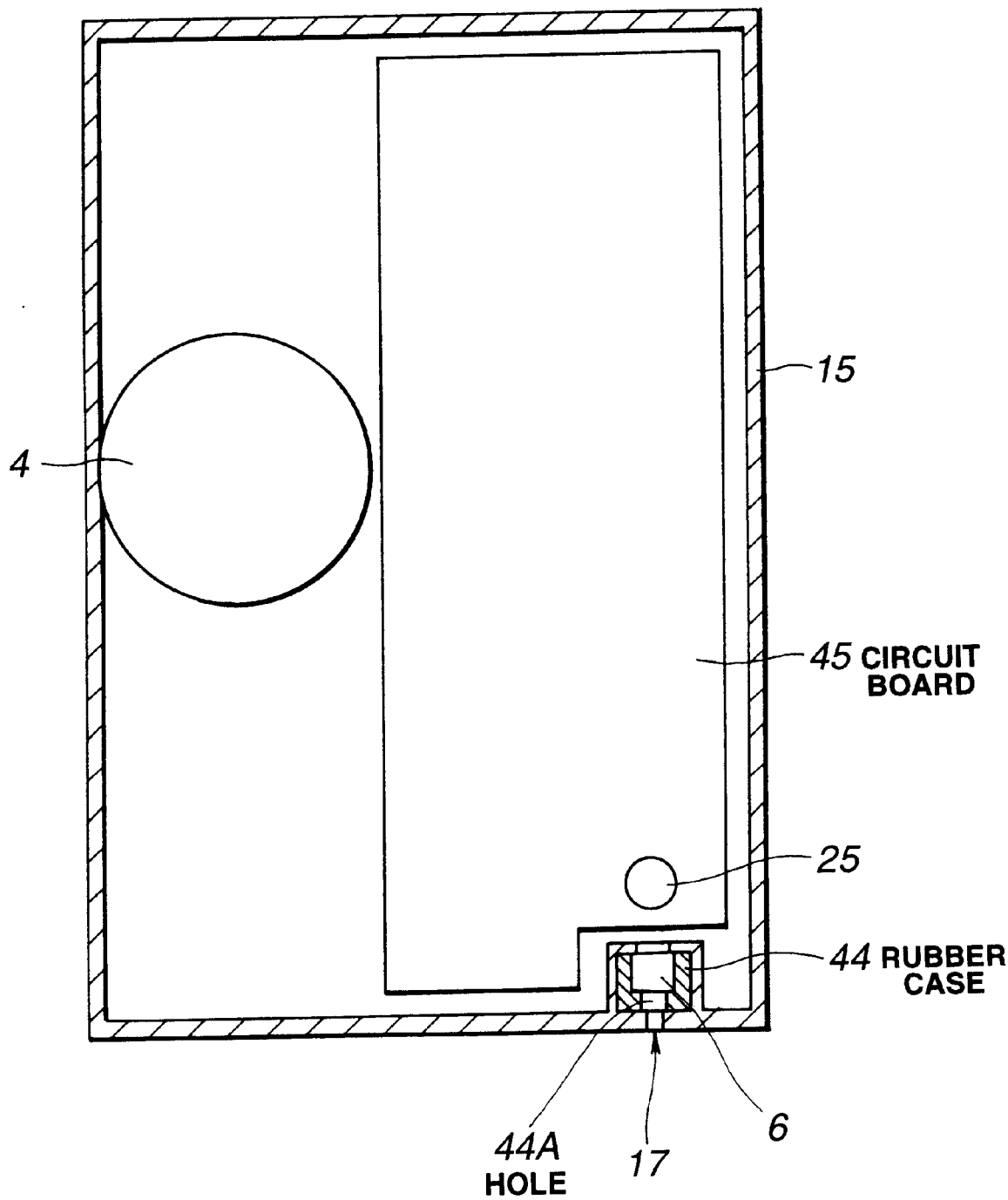
FIG. 9 is a transverse sectional view of a second variation of a speakerphone according to the embodiment of the present invention.
Figure 10:
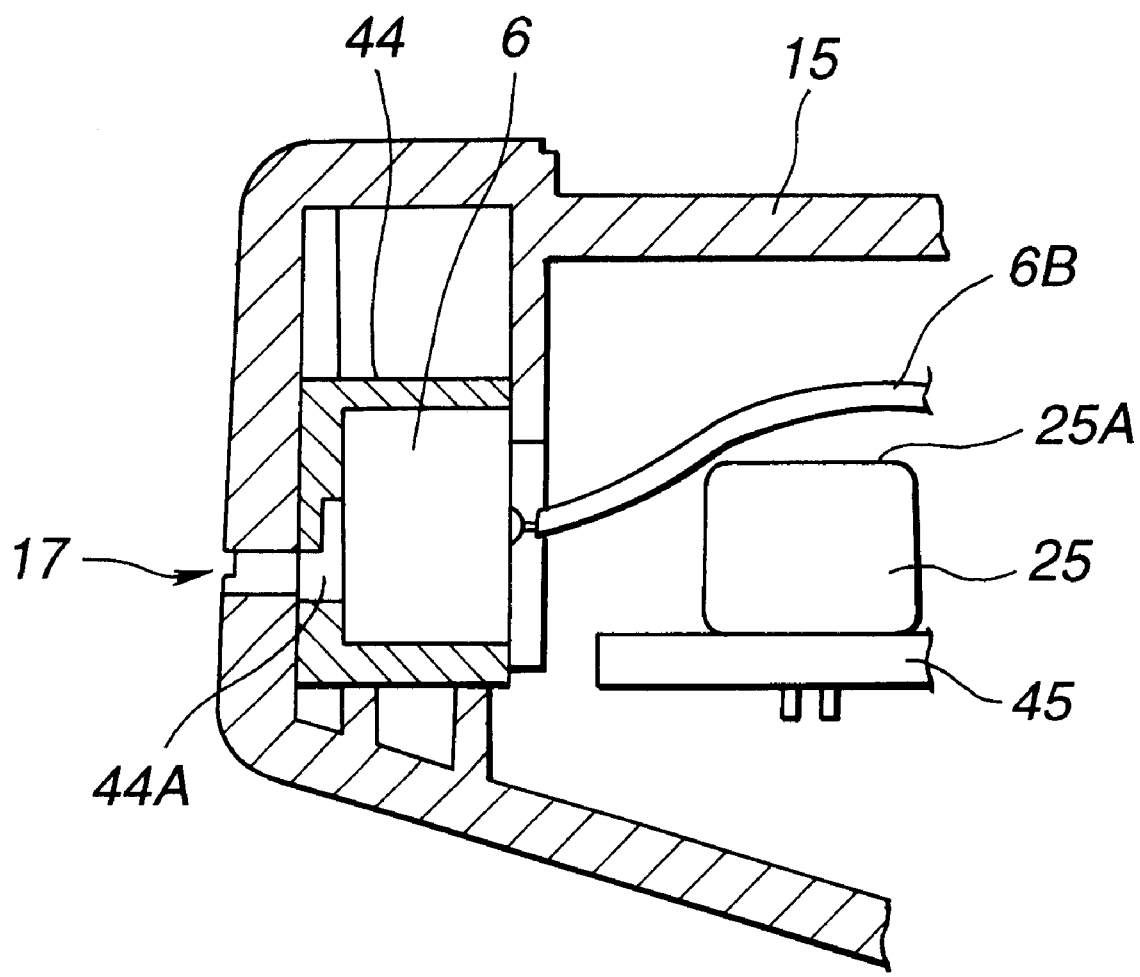
FIG. 10 is a sectional view of a portion for installing a speech microphone and a noise canceling microphone of the second variation of the speakerphone according to the embodiment of the present invention.

FIG. 9 is a transverse sectional view of a second variation of a speakerphone according to the present invention. In the speakerphone according to this variation, only the main microphone 6 is stored in a rubber case 44 and the sub microphone 25 is installed near the main microphone 6 on the circuit board 45 as shown in the figure. The circuit configuration of this speakerphone is shown in FIGS. 1 and 2. FIG. 10 is an enlarged view of a portion for installing the main microphone 6 and the sub microphone 25. As shown in this figure, the sub microphone 25 is installed on the circuit board 45 in such a manner that the sound introduction side 25A thereof faces up (front side of the loudspeaker telephone set). By directly installing the sub microphone 25 on the circuit board 45, the wire 25B therefor is made unnecessary, thereby making it possible to simplify the production process and reduce the production cost. Since the sub microphone 25 is not in direct contact with the housing 15, sounds transmitted through the cover or base forming the housing 15 are reduced and it is not always necessary to cover the sub microphone 25 by a rubber case.

However, in an alternate embodiment to prevent coupling caused by vibration, the sub microphone 25 may be covered by a microphone case made of an elastic material like the main microphone 6, that is, the sub microphone 25 may be covered by an elastic material excluding the sound introduction side 25A thereof in the mounting structure that the sub microphone 25 is installed on the circuit board 45 at the closest position to the main microphone 6 in the housing 15.

Figure 11:
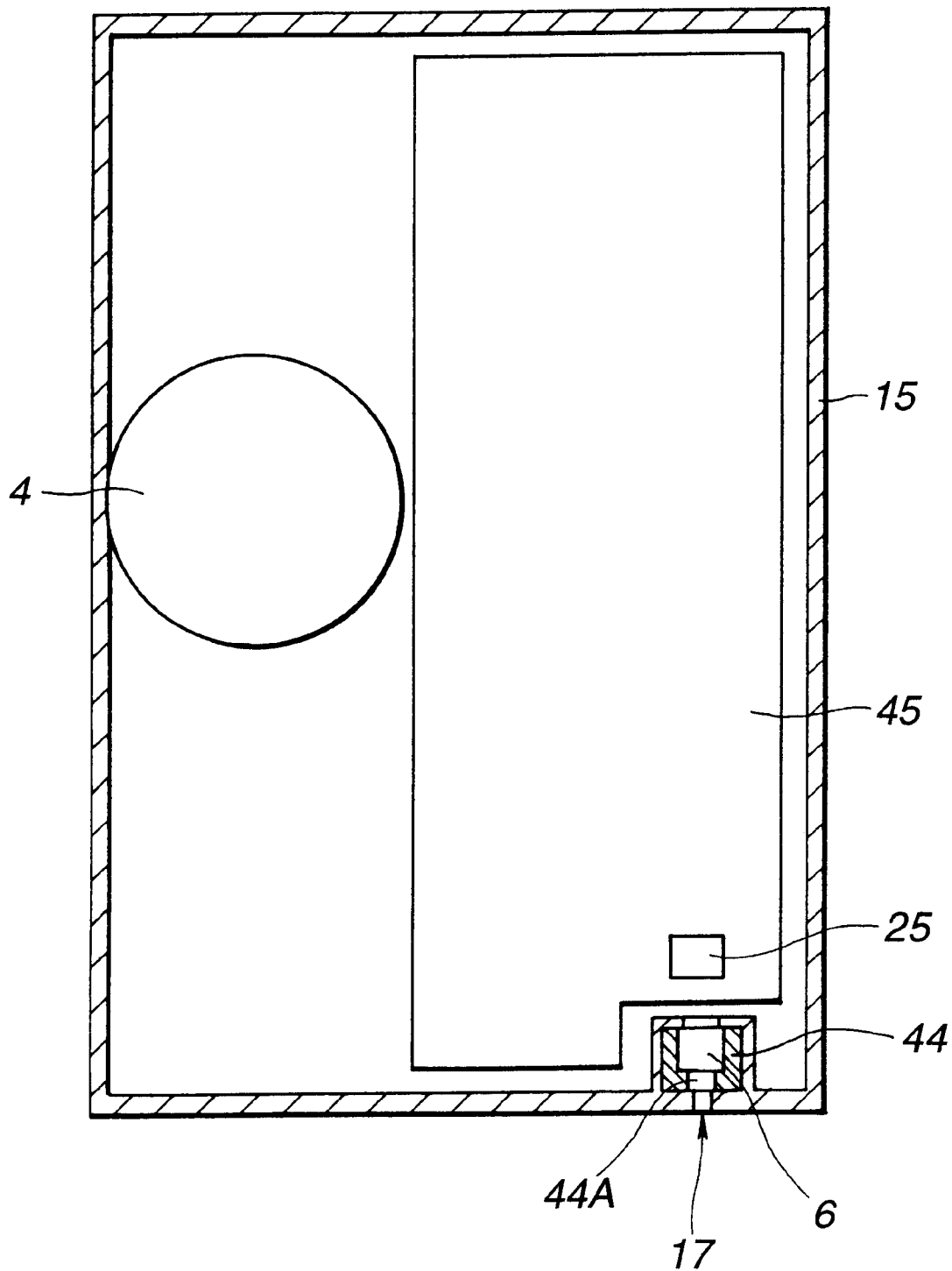
FIG. 11 is a transverse sectional view of a third variation of a speakerphone according to the embodiment of the present invention.
Figure 12:
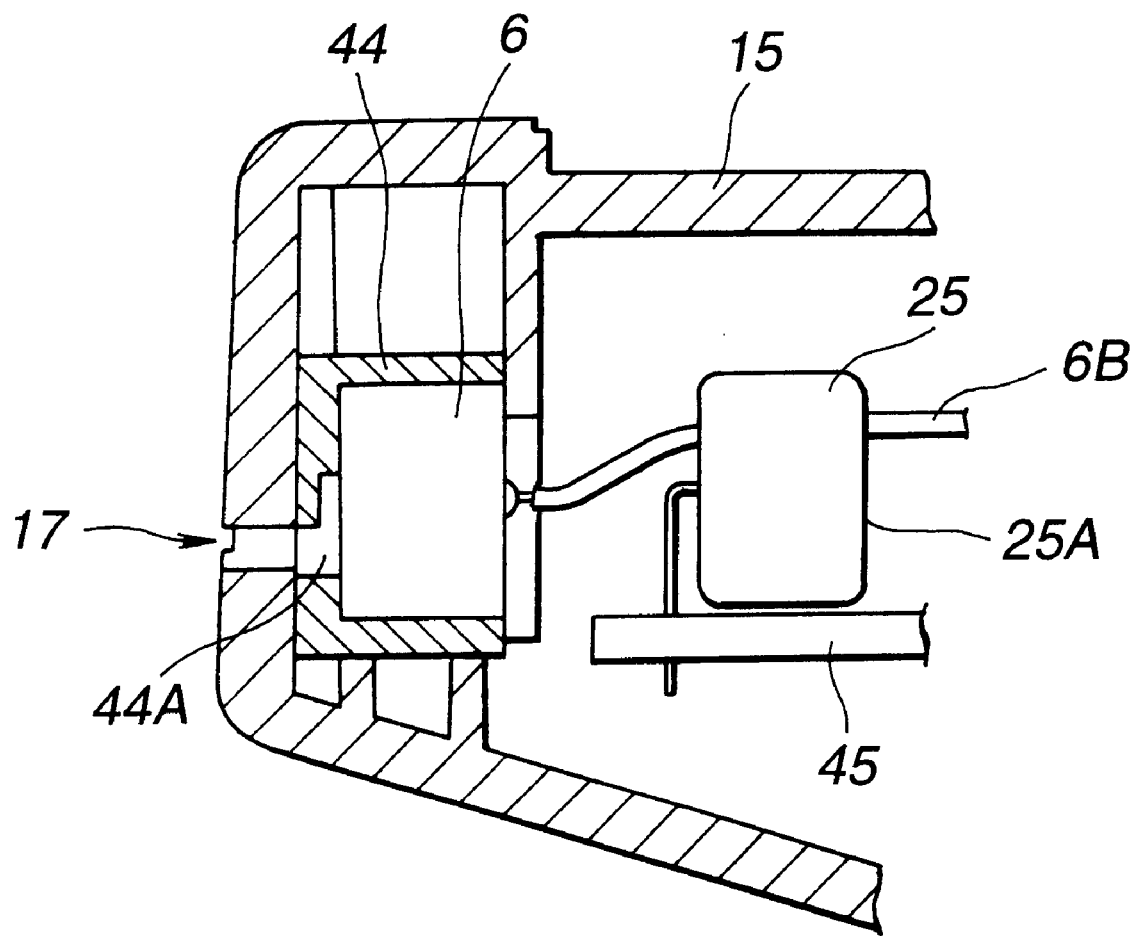
FIG. 12 is a sectional view of a portion for installing a speech microphone and a noise canceling microphone of the third variation of the speakerphone according to the embodiment of the present invention.

FIG. 11 is a transverse sectional view of a third variation of a speakerphone according to the present invention. In the speakerphone according to this variation, the sub microphone 25 of the above second variation is arranged in a horizontal direction (that is, to face the side wall of the housing 15). FIG. 12 is an enlarged view of a portion for installing the main microphone 6 and the sub microphone 25 in this variation. As shown in this figure, the sub microphone 25 is installed on the circuit board 45 in such a manner that the sound introduction side 25A thereof faces towards the interior of the housing 15. Also in this third variation, by directly installing the sub microphone 25 on the circuit board 45, the wire 25B is made unnecessary, thereby making it possible to simplify the production process and reduce the production cost. As the sub microphone 25 is not in direct contact with the housing 15, sounds transmitted through the cover or base forming the housing 15 are reduced and it is not always necessary to cover the sub microphone 25 by a rubber case. As having been described already, in an alternate embodiment the sub microphone 25 may be covered by an elastic material excluding its sound introduction side 25A in the mounting structure that the sub microphone 25 is installed on the circuit board 45 at the closest position to the main microphone in the housing 15.

What is claimed is:

1. A speakerphone comprising:
    a housing for the speakerphone;
    a loud speaker for outputting a sound based on a received sound signal;
    a speech microphone for inputting a voice of a user;
    a sub microphone for obtaining an input for detecting an acoustic component coming from the speaker via an inside of the housing;
    adding means for adding a signal from the sub microphone in opposite phase to a signal output from the speech microphone; and
    suppression means for suppressing an increase of acoustic coupling component by the adding means, wherein the speech microphone and the sub microphone are incorporated in the housing, the speech microphone faces an outside of the housing and the sub microphone faces an inside of the housing, and the suppression means is located between the sub microphone and the adding means.

2. The speakerphone according to claim 1, wherein the speech microphone and the sub microphone are located close to each other.

3. The speakerphone according to claim 1 or 2, wherein the suppression means extracts a signal of a frequency range having a high output level out of signals of all frequency ranges output from the loud speaker.

4. The speakerphone according to claim 1, wherein the suppression means is a bandpass filter amplifier which extracts only a 300 to 600 Hz frequency component.

5. The speakerphone according to claim 1, wherein the speech microphone and the sub microphone are provided in a housing, and a voice reaches the speech microphone through a sound input hole formed in the housing.

6. The speakerphone according to claim 1, further comprising:
    a speaker amplifier for amplifying a reception signal and supplying the amplified signal to the loud speaker; and
    a microphone amplifier for amplifying the output of the speech microphone.

7. The speakerphone according to claim 1, further comprising an elastic material case which covers the speech microphone and the sub microphone and has holes formed in respective portions facing a sound detection side of the speech microphone and a sound detection side of the sub microphone.

8. The speakerphone according to claim 1, wherein the speech microphone is covered by an elastic material case excluding a sound detection side thereof and installed in a housing in such a manner that the sound detection side faces a sound input hole formed in the housing, and the sub microphone is installed on a circuit board in the housing at the closest position to the speech microphone.

9. The speakerphone according to claim 1, wherein the adding means is a differential amplifier.

10. The speakerphone according to claim 1, further comprising means for attenuating a transmitted signal from the speech microphone during reception and attenuating a received signal to be supplied to the loud speaker during transmission.

11. A speakerphone according to claim 1, wherein the speech microphone is covered excluding a sound detection side thereof which faces a sound input hole formed in a housing, and wherein the sub microphone is installed on a circuit board in the housing at the closest position to the speech microphone.

12. A speakerphone comprising:
    a housing containing a loud speaker for outputting a sound based on a received sound signal;
    a speech microphone for inputting a voice of a user;
    a sub microphone for detecting an acoustic component coming from the loud speaker via an inside of the housing;
    adding means for adding a signal from the sub microphone in opposite phase to a signal output from the speech microphone;
    suppression means for suppressing an increase of acoustic coupling component by the adding means; and
    a microphone case covering the speech microphone and the sub microphone, wherein the microphone case is made of an elastic material having two holes facing in opposite directions, one hole facing a sound detection side of the speech microphone and the other facing a sound detection side of the sub microphone, and the suppression means is located between the sub microphone and the adding means.

13. The speakerphone according to claim 12, wherein said microphone case covers the speech microphone excluding the sound detection side thereof which faces a sound input hole formed in a housing and covers the sub microphone in such a manner that the sub microphone can be located at the rear of the speech microphone with a barrier interposed therebetween.

14. The speakerphone according to claim 12, wherein said case covers the speech microphone excluding the sound detection side thereof which faces a sound input hole formed in a housing and covers the sub microphone in such a manner that the sub microphone can be located next to the sound input hole with a barrier interposed therebetween while the sound detection side thereof faces the rear of the case.

15. The speakerphone according to claim 1, wherein the speech microphone and the sub microphone are located close to each other, and a sound detection side of the speech microphone is positioned 90 degrees with respect to a sound detection side of the sub microphone.

16. The speakerphone according to claim 1, wherein the speech microphone and the sub microphone are located close to each other, and a sound detection side of the speech microphone is positioned 180 degrees with respect to a sound detection side of the sub microphone.

17. A speakerphone comprising:
    a telephone circuit which is capable of being connect to a telephone line network;
    a handset comprising a telephone transmitter and a telephone receiver;
    a switch for connecting the handset to the telephone circuit and for placing the handset in a use state;
    a housing for the speakerphone;
    a loud speaker for outputting a sound based on a received sound signal;
    a speech microphone for inputting a voice of a user;
    a sub microphone for obtaining an input for detecting an acoustic component coming from the speaker via an inside of the housing;
    adding means for adding a signal from the sub microphone in opposite phase to a signal output from the speech microphone; and
    suppression means for suppressing an increase of acoustic coupling component by the adding means wherein, the speech microphone and the sub microphone are incorporated in the housing, the speech microphone faces an outside of the housing and the sub microphone faces an inside of the housing, and the suppression means is located between the sub microphone and the adding means.

18. A microphone case in a speakerphone housing, wherein the housing includes:
    a small room for storing the microphone case;
    a loud speaker for outputting a sound based on a received sound signal;
    a speech microphone for inputting a voice of a user;
    a sub microphone for detecting an acoustic component coming from the speaker via an inside of the housing;
    an extraction means for extracting a prescribed frequency component of a signal output from said sub microphone; and
    an adding means for adding a signal extracted by the extraction means in opposite phase to a signal output from the speech microphone,
    wherein the small room has two holes facing in an opposite direction, the one hole facing an inside of the housing and the other hole facing an outside of the housing, and
    wherein the microphone case covers the speech microphone and the sub microphone and is made of an elastic material having two holes facing in an opposite direction, the one hole facing a sound detection side of the speech microphone and the other facing a sound detection side of the sub microphone, and
    wherein the microphone case is stored in the small room.

19. The microphone case according to claim 18, wherein said microphone case covers the speech microphone excluding the sound detection side thereof which faces a sound input hole formed in the housing and covers the sub microphone in such a manner that the sub microphone can be located at the rear of the speech microphone with a barrier interposed therebetween.

20. The microphone case according to claim 18, wherein the case covers the speech microphone excluding the sound detection side thereof which faces a sound input hole formed in the housing and covers the sub microphone in such a manner that the sub microphone can be located next to the sound input hole with a barrier interposed therebetween while the sound detection side thereof faces the rear of the case.

* * * * *

UNITED STATES PATENT AND TRADEMARK OFFICE
CERTIFICATE OF CORRECTION

PATENT NO. : 6,266,410 B1
DATED : July 24, 2001
INVENTOR(S) : Takahashi et al.

Page 1 of 1

It is certified that error appears in the above-identified patent and that said Letters Patent is hereby corrected as shown below:

Column 13, claim 17,
Line 7, change "being connect" to -- being connected --.

Signed and Sealed this

Twelfth Day of March, 2002

*Attest:*

*Attesting Officer*

JAMES E. ROGAN
*Director of the United States Patent and Trademark Office*